United States Patent [19]
Takiguchi et al.

[11] Patent Number: 6,095,272
[45] Date of Patent: Aug. 1, 2000

[54] INSTRUMENT PANEL UNIT

[75] Inventors: Shuji Takiguchi; Keizo Nishitani, both of Shizuoka, Japan

[73] Assignee: Yazaki Corporation, Tokyo, Japan

[21] Appl. No.: 08/893,484

[22] Filed: Jul. 11, 1997

[30] Foreign Application Priority Data

Jul. 15, 1996  [JP]  Japan .................................. 8-185137

[51] Int. Cl.[7] .......................... B60K 37/00; B62D 25/14; B60L 3/00; H02B 1/04
[52] U.S. Cl. ............................. 180/90; 296/70; 361/647; 307/10.1
[58] Field of Search .............................. 180/90; 296/70, 296/72; 439/34; 307/9.1, 10.1; 361/664, 690, 647

[56] References Cited

U.S. PATENT DOCUMENTS

| | | | |
|---|---|---|---|
| 5,353,190 | 10/1994 | Nakayama et al. | 361/647 |
| 5,615,080 | 3/1997 | Nishitani et al. | 361/664 |
| 5,627,409 | 5/1997 | Nishitani | 307/10.1 |
| 5,762,395 | 6/1998 | Merrifield et al. | 296/203 |
| 5,856,908 | 1/1999 | Takiguchi et al. | 361/690 |
| 5,857,726 | 1/1999 | Yokoyama et al. | 296/70 |
| 5,883,777 | 3/1999 | Nishitani et al. | 361/647 |
| 5,889,337 | 3/1999 | Ito et al. | 307/10.1 |
| 5,979,965 | 4/1999 | Nishijima et al. | 180/90 |

FOREIGN PATENT DOCUMENTS

| | | |
|---|---|---|
| 197 20 714 A1 | 1/1998 | Germany . |
| 9-306608 | 11/1997 | Japan . |

*Primary Examiner*—Lanna Mai
*Assistant Examiner*—Jeff Restifo
*Attorney, Agent, or Firm*—Armstrong, Westerman, Hattori, McLeland & Naughton

[57] ABSTRACT

An instrument panel unit for easily assembling a number of parts by eliminating instrument panel sublines, wherein the instrument panel is provided with a plurality of windows on a front wall thereof, a first fixture guide is attached to a position where corresponds to the respective windows at the back of the front wall, a second fixture guide is respectively attached at the back of the front wall of the instrument panel, function parts, such as center displays, second displays at the driver seat, and safety functions such as an air bag system at passenger seat, are installed in the respective windows of the instrument panel unit, control parts are also accommodated in the instrument panel unit for controlling the function parts, and a circuit element is provided within the instrument panel unit along the back of the front wall, which circuit element has branches extending to the first and second fixture guides and connecting the function parts and the control parts with each other through connectors attached at the ends of the branches, whereby when the function parts are mounted to the first fixture guides and the control parts are mounted to the second fixture guides for installation, the connectors are connected thereto for providing electrical connection.

9 Claims, 9 Drawing Sheets

INSTRUMENT PANEL UNIT

BACKGROUND OF THE INVENTION

1. Field of the Invention

The present invention relates to an instrument panel unit easily assembled and mounted to a motor vehicle body.

2. Description of the Related Art

In a narrow space of an instrument panel, there have been installed many electrical elements such as meter units, switch assemblies, navigation units, a. radio set, and control units for such electrical elements. It has been taken a long period of time and much manpower to mount the electrical elements and to provide wiring therefor, which has been resulted in one of factors to prevent the improvement of productivity of motor vehicles.

Figure 10:
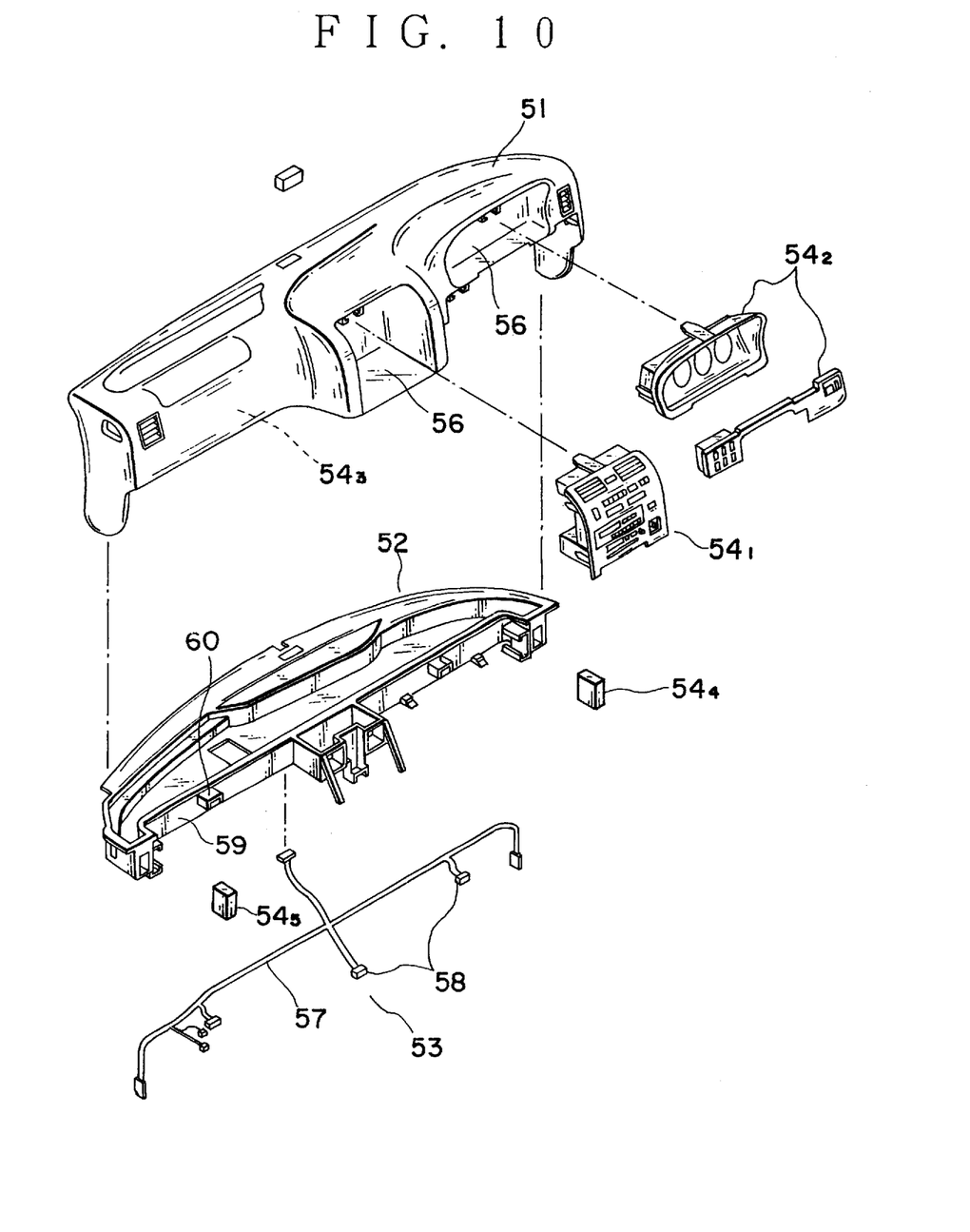
FIG. 10 is an explanatory drawing for illustrating a conventional instrument panel unit.

To solve the aforementioned problems encountered with the conventional motor vehicles, a wire harness device for use in instrument panels, such as illustrated in FIG. 10, has been proposed in Japanese Patent Application No. Heisei 8-121999.

The wire harness device for the instrument panel of FIG. 10 consists of an instrument panel 51, an assembly box 52 which also works as an air duct, a wire harness for instrument panel 53 and a plurality of electrical equipment units 54 ($54_1$, $54_2$ ... ).

Each electrical equipment unit 54 is provided with a connector which is connected to a wire harness not shown, and on the instrument panel 51 is formed a mounting cavity 56 for each electrical equipment unit 54, and in the wire harness 53, a flat wiring member 57 is provided with receptive connectors 58 for the electrical equipment units.

Further, on a side wall of the assembly box 52 are formed a harness mounting channel 59 and a plurality of connector holders 60, and to the harness mounting channel 59 is positioned and secured the wire harness. 53 for instrument panel, and on each of the connector holders 60 is supported the receptive connector 58.

With this construction, by mounting the electrical equipment unit 54 to each of the mounting cavities 56 of the instrument panel 51, the connectors for being connected with said harness are connected to the receptive connectors 58.

According to the wire harness device for the instrument panel illustrated in FIG. 10, when the electrical equipment units $54_1$, $54_2$ are mounted to each of the mounting cavities 56 from the front side of the instrument panel 51, the connectors for connecting with the harness are simultaneously connected to the receptive connectors 58, which establishes the connection with the wire harness 53 of the instrument panel to form electrical circuits. Therefore, troublesome works such as installation of wire harnesses in the narrow space and engagement and connection for many connectors can be eliminated, resulting in remarkably improved mountability and workability.

However, when the work of mounting the instrument panel 51 is examined from the side of a motor vehicle manufacturer, movable connectors, that is, the receptive connectors 58, are necessary to connect each of the electrical equipment units 54 ($54_1$, $54_2$). Furthermore, it is required for the manufacturer to equip instrument panel sub-lines in order to mount each of the electrical units 54 ($54_1$, $54_2$, ... ), therefore, much manpower is still necessary for the manufacturer side.

SUMMARY OF THE INVENTION

The present invention has been made in consideration of the aforementioned problems, and the objective of the present invention is to provide an instrument panel unit in which an instrument panel itself can easily be assembled; the number of parts and manpower are reduced; and instrument panel sub-lines on the side of the motor vehicle manufacturer can be eliminated.

To accomplish the above objectives, the instrument panel unit according to the present invention comprises: an instrument panel made of synthetic resin; a plurality of windows formed on a front wall of the instrument panel; a first fixture guide attached to a position, where corresponds to each of the plurality of windows, on the back side of the front wall of the instrument panel; a second fixture guide attached on the back side of the front wall of the instrument panel unit; function parts mounted to the plurality of windows of the instrument panel, the function parts providing display, operation, and safety functions such as meters, switches, and air bag system at passenger seat; control parts accommodated in the instrument panel unit, the control parts controlling the function parts; a circuit element accommodated in the instrument panel unit along the back surface of the frontal wall, the circuit element having branches extending to the first and second fixture guides, the circuit element connecting the functional parts and the control parts to each other; and connectors attached to the ends of the branches, the function parts, and the control parts, wherein when the function parts are mounted to the first fixture guides and the control parts are mounted to the second fixture guides, the connectors are connected with each other, and the function parts and control parts are electrically connected to the circuit element.

With the instrument panel unit described above, since the front wall of the instrument panel, on which a number of function parts and control parts are to be mounted, is provided with fixture guides for making it possible to equip, on the rear surface of the front wall, a circuit element for electrically connecting the aforesaid parts and connectors, the number of parts to be used for the instrument panel unit is decreased and that the steps of connecting the parts.

Further, the instrument panel according to the present invention can be handled as a single unit in which a variety of function parts and control parts and a circuit element for electrically connecting those parts to each other are integrally accommodated, therefore, instrument panel sub-lines can be eliminated at the car manufacturer side, thus resulting in considerable increase in its productivity.

The instrument panel unit described above may further comprise a switch contact portion, which constitutes a switch contact plate, on the front wall of the instrument panel, and the switch contact plate, inclusive of such switch contact portion, is preferably made of heat resisting resin which is different in nature from the synthetic resin forming the instrument panel. Further, the switch contact plate can be attached to one of the plurality of windows.

With the instrument panel unit described above, a switch contact portion is directly formed on the instrument panel, so that a switch unit as a function part is superfluous, resulting in a decreased number of parts. Further, since only the switch contact plate including the switch contact portion is made of heat resisting resin, material costs of the instrument panel can be held down, and electrical parts can automatically be connected using an automatic solder. Further, since the switch contact plate is attached to one of the plurality of windows, the plate is also mounted on the back of the instrument panel as in the function parts.

The instrument panel unit described above may further comprise dustproof covers independently being covered on the function parts and the control parts mounted on the back side of the front wall. With this configuration, only the essential parts can be protected from the dust and decreasing a dead space at the back of the instrument panel.

In the above instrument panel unit, in place of the dustproof covers, a duct box may be used, which causes the total number of parts decrease in the instrument panel unit. Further, it is possible to mount the cover member between the instrument panel unit and the duct box.

With the above mentioned instrument panel unit, the back of the instrument panel can be protected by the duct box and the cover member, so that the function parts mounted at the back of the instrument panel are protected from being damaged, the reliability of the products are improved, safety during the transportation is secured, and the distribution of the instrument panel unit itself can be carried out smoothly.

In the instrument panel unit described above, the connectors may be face-to-face contact type connectors, which permits the conductor of the circuit element to be used as a connector terminal, thus resulting in a reduced number of parts for the instrument panel unit.

BRIEF DESCRIPTION OF THE DRAWINGS

The present invention will be more apparent from the ensuring description with reference to the accompanying drawings wherein.

DETAILED DESCRIPTION OF PREFERRED EMBODIMENTS

Now, an instrument panel unit according to an embodiment of the present invention will be described with reference to the drawings.

Figure 1:
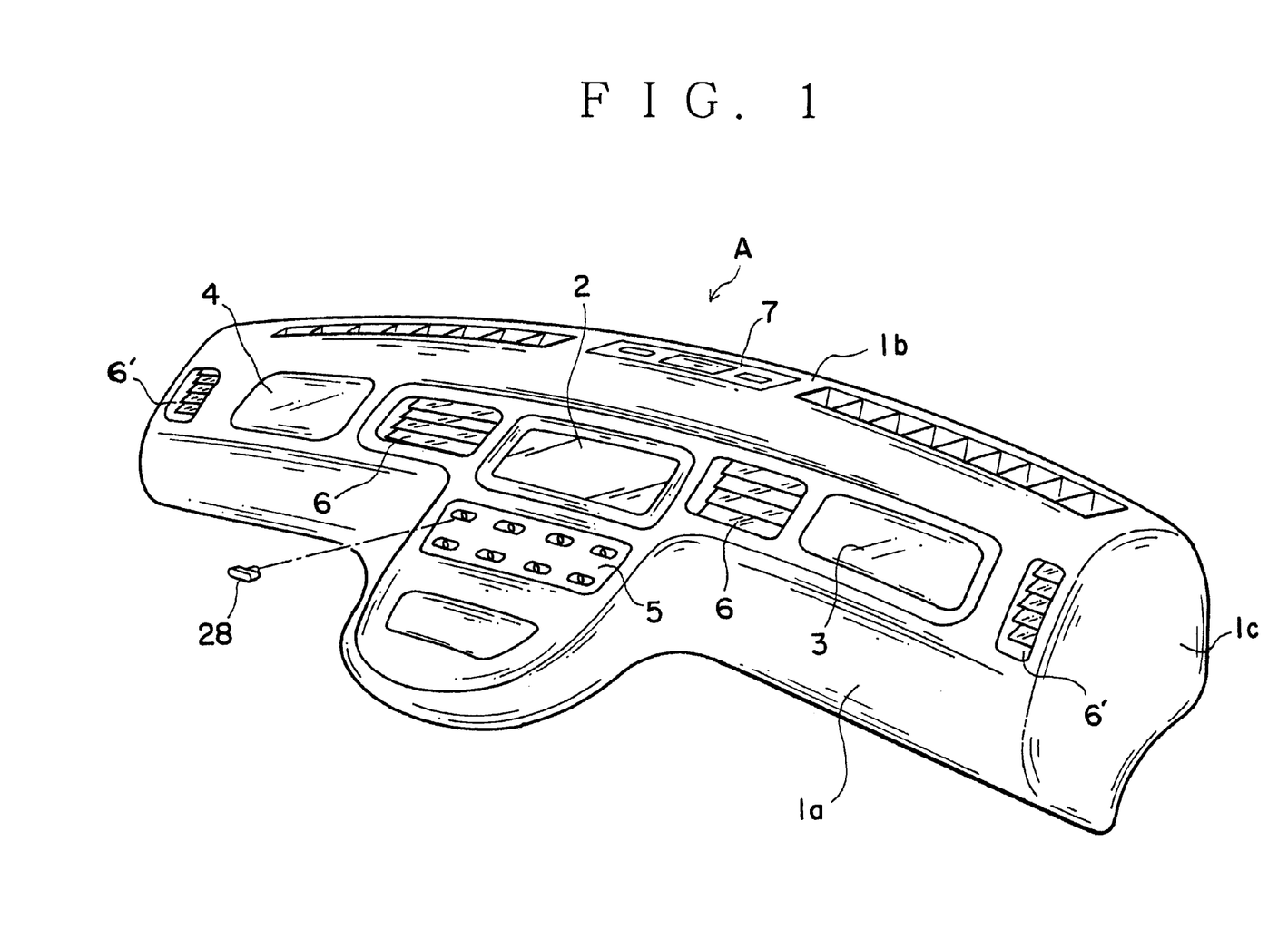
FIG. 1 is a perspective view of a front side of an instrument panel unit according to an embodiment of the present invention.
Figure 2:
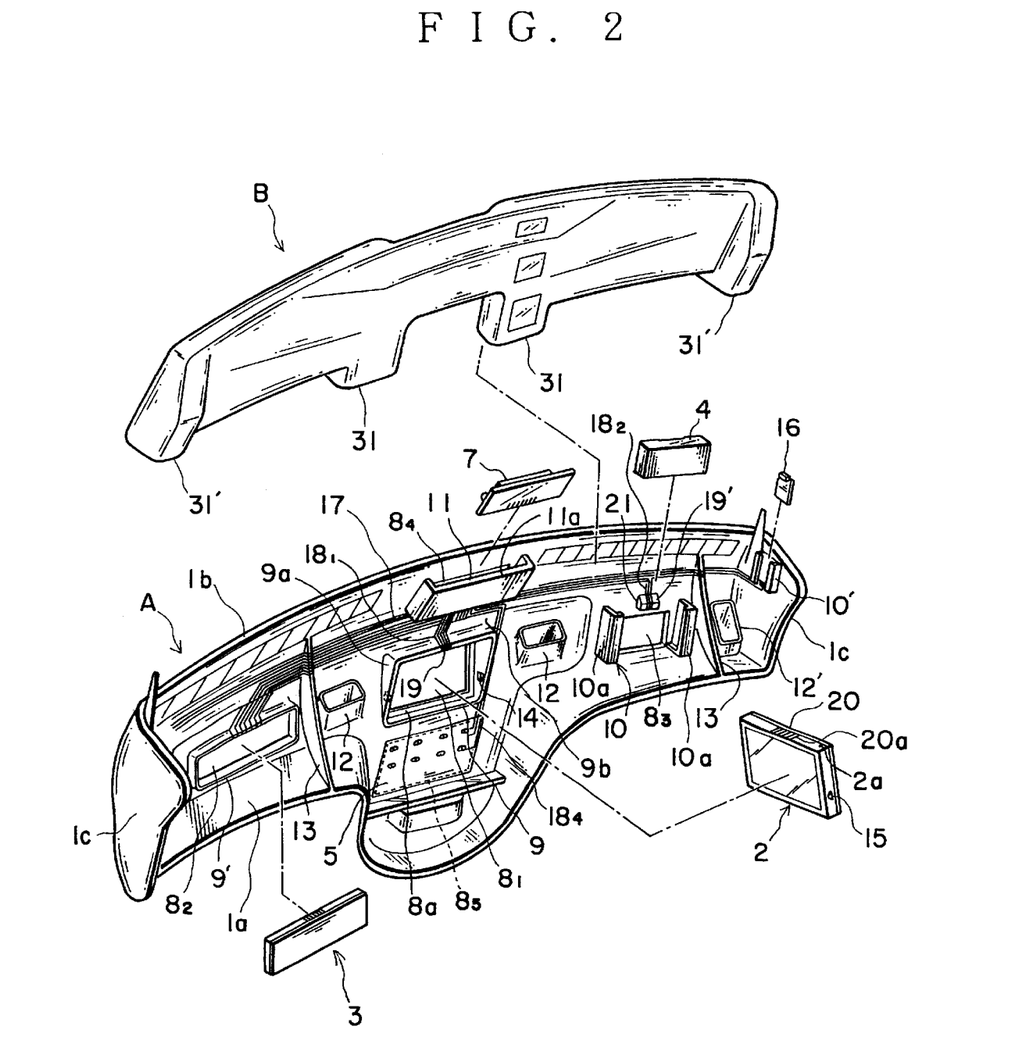
FIG. 2 is an exploded perspective view of the instrument panel unit of FIG. 1.

In FIGS. 1 and 2, reference character A is an instrument panel made of synthetic resin, and B is a duct box for an air conditioner which is mounted to the back of the instrument panel A. The duct box B is also made of synthetic resin. To the duct box B, mounted is a pair of main ducts 31 at the lower center thereof so as to extend downward and, at the both ends of the duct box B, formed are hook-shaped subducts 31' so as to bend to this side. Those ducts 31, 31' are engaged with and connected to duct covers 12, 12' of the instrument panel A described below.

In the instrument panel A, a center display 2 such as a television set is mounted at the central part of the front wall 1a, a second display 3 such as an EL display is mounted at the side of a driver seat on the right, and an air bag unit 4 is mounted at the side of a passenger seat on the left. Further, underneath the center display 2, a switch contact plate 5 is arranged.

Further, on the front wall 1a are formed vent holes 6, 6' with fins at both sides of the center display 2 and both right and left sides of the front wall 1a, and the bent holes 6, 6' are connected to main ducts 31 and subducts 31' of the duct box B through the duct covers 12, 12' at the back thereof. Further, on the top wall 1b of the instrument panel A is mounted a sensor integration 7.

As illustrated in FIG. 2, on the front wall 1a and the top wall 1b of the instrument panel A are formed a plurality of windows $8_1$, $8_2$, . . . $8_5$ (representatively indicated as 8, hereinafter other reference numerals are indicated in the same manner), and on the back thereof are formed three kinds of fixture guides such as a frame-type fixture guide 9, an insertion-type fixture guide 10 and a drawer-type fixture guide 11. On respective back sides of the ducts 6, 6', respective duct covers 12, 12' are integrally formed with the instrument panel A, and a plurality of partition walls 13 functioning as a reinforcing member as well are attached to the back of the bent holes 6, 6'.

On the back of the center window $8_1$ is mounted the frame-type fixture guide 9. That is, the dimension of the window $8_1$ is smaller than that of the center display 2, and when the display 2 is engaged from the rear side of the instrument panel A, a frame 8a in the frame-type fixture guide 9 functions as a stopper.

The left side window $8_2$ of the window $8_1$ is used for mounting the second display 3, and on the back of the window $8_2$ is attached a fixture guide 9' having the same structure as that of the frame-type fixture guide 9.

There are provided locking holes 14 at right and left frames 9a of the frame-type fixture guide 9. The locking holes 14 constitute locking means in combination with locking projections 15 on the both outer peripheral portions of the center display 2.

Figure 3:
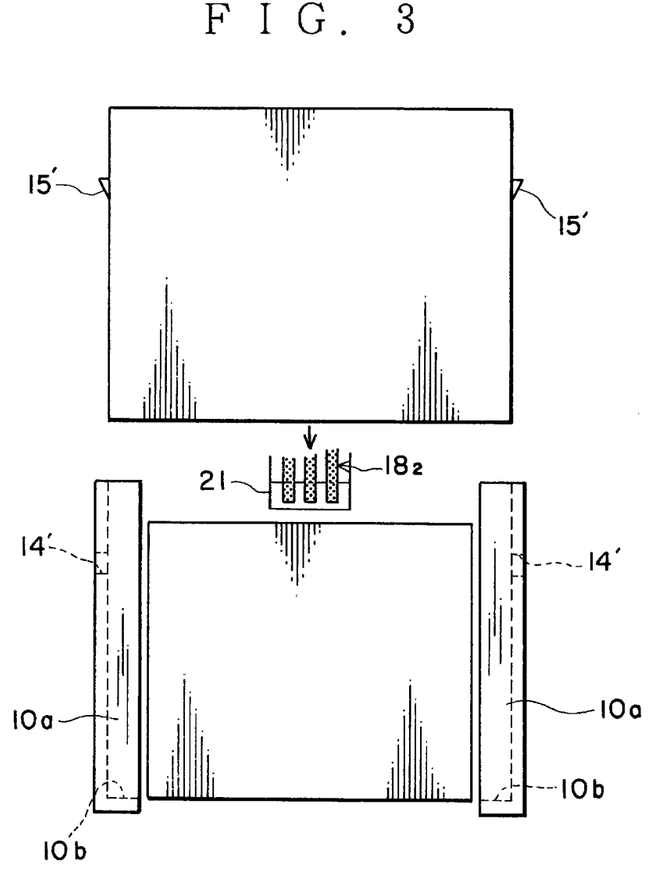
FIG. 3 is a partially cross-sectional view of a locking structure for a fixture guide of the air bag unit of FIG. 2.

On both sides of the back of the mounting widow $8_3$ for the air bag unit 4 are formed guide frames 10a having an L-shaped cross section to form the insertion-type fixture guide 10. As illustrated in FIG. 3, each of the guide frames 10a has a bottom, and this bottom portion 10b prevents the air bag unit 4 from being drawn off at the insertion of the air bag unit 4. Locking holes 14' and locking projections 15' are provided on both sides of the guide frame 10a in the same manner as described above.

Now, referring to FIG. 2, the widow $8_4$ is used for mounting the sensor integration 7, and a cover 11a constituting the drawer-type fixture guide 11 is provided on the back of the top wall 1b. Further, there is no fixture guide on the window $8_5$ for mounting the switch contact plate 5, therefore, the switch contact plate 5 is secured through screws (not shown), however, it is possible to provide a fixture guide like the insertion-type fixture guide 10 or the drawer-type fixture guide 11.

Further, portions other than the windows $8_1$ to $8_5$, in other words, insertion-type fixture guides 10' having the same structure as that of the insertion-type fixture guides 10 are provided on respective inner sides of respective side walls 1c on both sides of the instrument panel, so that the control unit 16 can be detachably mounted.

Further, on the rear surface (the surface of the inner wall) of the front wall 1a, arranged is a circuit element 17 so as to horizontally extend from one end of the instrument panel A to the other, and branches 18 extend from the circuit element 17 to the fixture guides 9, 10 for the parts described above.

In the circuit element 17 according to this embodiment, a plurality of circuit conductors (not shown) are arranged in parallel, in a three-dimensional configuration, and formed integrally with an inner wall of the instrument panel A by employing a conventional method such as a two-shot method, additive method or the like. In place of the integrally forming method described above, it is possible to fix, by utilizing a bonding agent, an ordinary flexible flat cable (FFC) or a flexible planar circuit (FPC) formed with a plurality of circuit conductors, such as copper foils, onto an insulation sheet.

Figure 4:
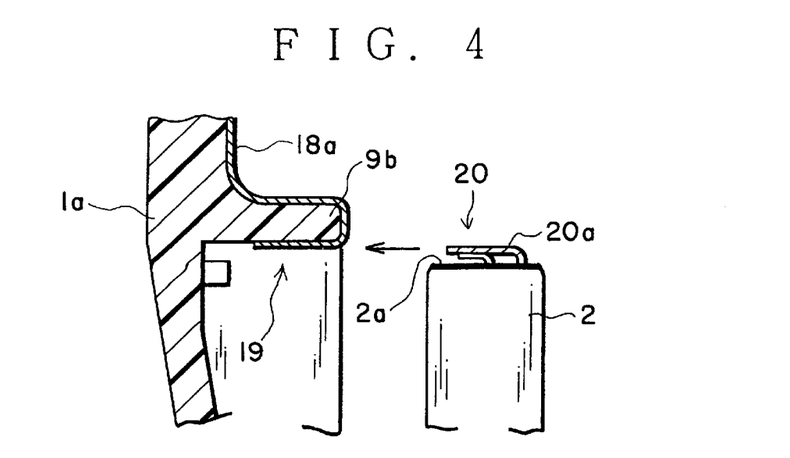
FIG. 4 is a cross-sectional view of a main part of an electrical connecting structure of the circuit element and a center display.

For example, a branch, which is indicated by the reference numeral $18_1$ and extends to the frame-type fixture guide 9, is provided with, as shown in FIG. 4, a plurality of circuit conductors 18a from the inner surface of the front wall 1a along the outer surfaces, ends and inner surfaces of the upper frame 9b, and end portions of the conductors provided along the inner surface of the ends are formed into connecting portions 19. On the other hand, a plurality of connecting strips 20a continued to inner circuits (not shown) are provided as being exposed on the outer peripheral surface 2a of the center display 2 correspondingly to the connector 19 in order to form connecting portions 20.

In the same manner, as illustrated in FIG. 3, the branch $18_2$ extending between the guide frames 10a on both sides of the insertion-type fixture guide 10 reaches to the surface of a spacer 21, which projects from the surface of the inner wall to form a connecting portion 19', which is then connected to a corresponding connecting portion (not shown) of the air bag unit 4.

Figure 5A:
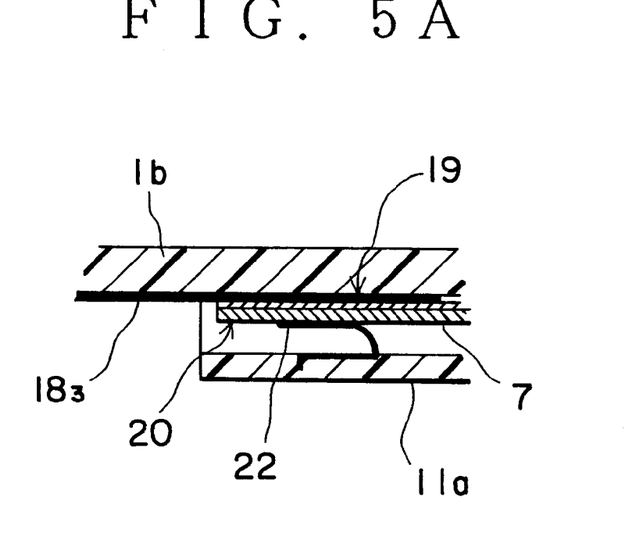
FIG. 5A is a cross-sectional view of the connecting structure between a sensor integration and circuit element of FIG. 2.

FIG. 5A shows a cross section of the branch $18_3$ extending to the cover 11a of the drawer-type fixture guide 11. That is, on the surface of the inner wall of the ceiling wall 1b surrounded by the cover 11a is formed into the connecting portion 19 and, at the inner side of the cover 11a, a leaf spring 22 is arranged. As a result, the sensor integration (printed circuit board) 7, which is inserted into the cover 11a, is pressed against the surface of the inner wall to strengthen the contacting pressure of the connecting portion 20 on the connecting portion 19 of the branch $18_3$ to obtain preferable electrical connection.

Figure 5B:
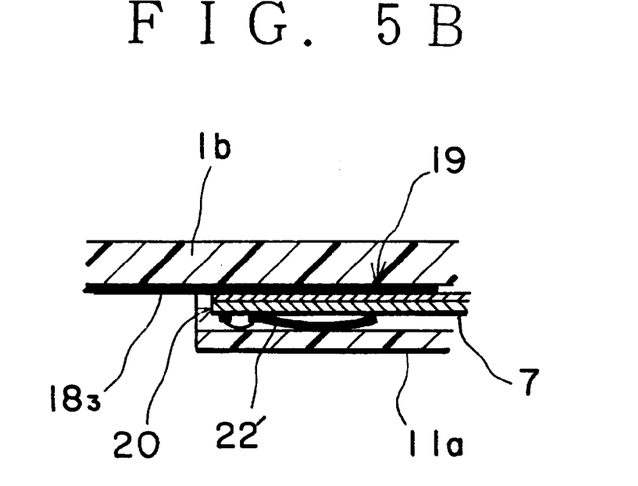
FIG. 5B is a cross-sectional view showing another structure of the sensor integration and the circuit element of FIG. 2.

In the construction illustrated in FIG. 5B, instead of mounting the leaf spring 22 on the inner surface of the cover 11a, a leaf spring 22' is fixed on the surface opposing the cover 11a of the sensor integration 7 to increase the contacting pressure of the sensor integration 7 making use of the reaction force of the leaf spring 22'.

Figure 6:
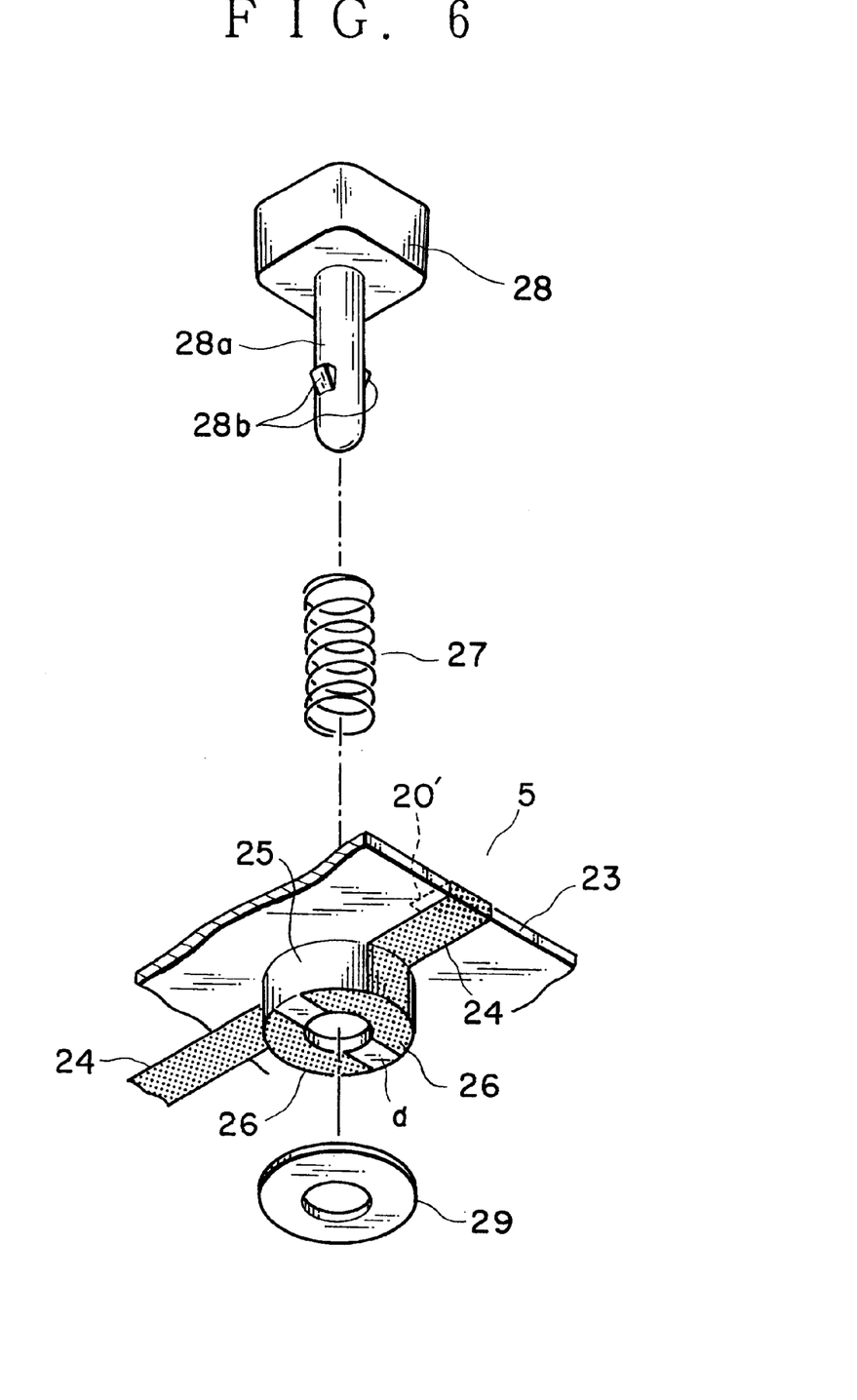
FIG. 6 is an exploded perspective view of the switch contact plate of FIG. 2.

FIG. 6 is an exploded perspective view of the switch contact plate 5 of FIG. 2. That is, on the back of the base plate 23 made of heat resisting resin, there are formed a plurality of circuit conductors 24 made of copper foil, and an end portion of each of the circuit conductors 24 is continued to the surface of the switch contact plate 5 to form the connecting portion 20'. As a result, the switch contact plate 5 is secured to the window $8_5$ by means of screws for connecting the connecting portion 20' with a connector (not shown) of the branch $18_4$.

In the middle of each circuit conductor 24 of the switch contact plate 5, a cylindrical boss 25 is projected, and a pair of fixed contacts 26 are formed on the end face of the cylindrical boss 25 as switch contact portions by providing a suitable distance d therebetween. With the above-mentioned construction, a downward shaft 28a of a key top 28 is penetrated through a coil spring 27 from the surface (that is, from the front surface side of the instrument panel A) of a base plate 23 to secure a washer type movable contact 29 to the cylindrical boss 25 by means of detents 28b on both sides of the rod 28a for preventing the key top 28 from slipping off. In this manner, there is formed a normally closed switch, in which the movable contact 29 normally contacts with the pair of fixed contacts 26 for providing the conduction thereof and, at the time when the key top 28 is pressed against the tension of the coil spring 27, the pair of fixed contacts 26 are parted from the movable contact 29.

Figure 7:
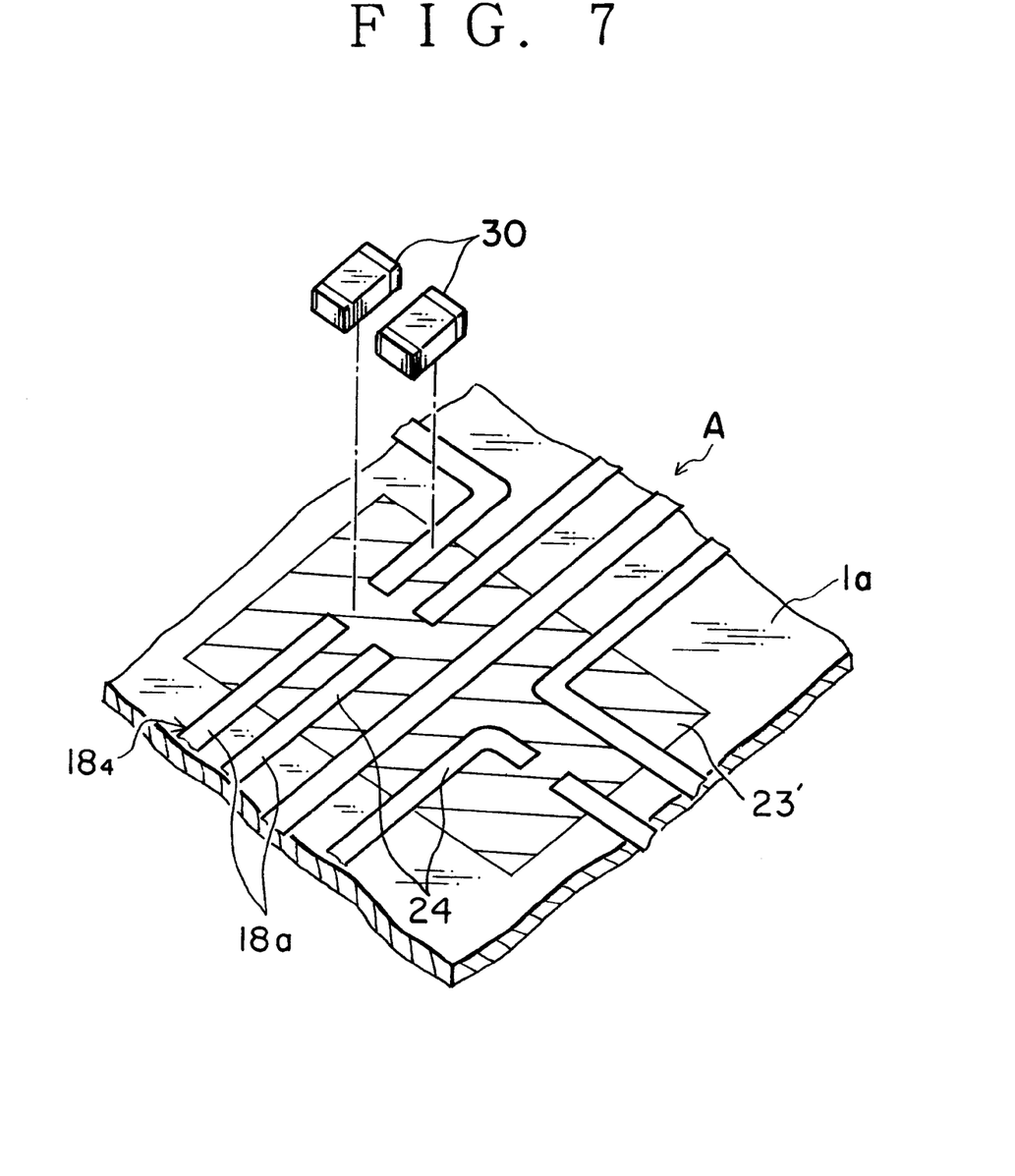
FIG. 7 is a drawing for explaining another embodiment of the switch contact plate of FIG. 2.

FIG. 7 shows the switch contact plate 5 according to another embodiment of the present invention, in which a base plate 23' made of heat resisting resin is integrally formed with the instrument panel A made of ordinary synthetic resin. In this case, the circuit conductor 24 constituting the inner circuit of the switch contact plate 5 may be integrally formed with the circuit conductor 18a of the branch $18_4$, which can eliminate the connecting portion 20' or the like from being provided. Further, with the use of heat resisting resin base plate 23', every electrical part (chip) can be mounted through automatic soldering.

Further, as another embodiment of the switch contact plate 5 according to the present invention, it is possible to directly mount a switch contact portion (a fixed contact 26) on the front wall 1a of the instrument panel A, which is made of ordinary synthetic resin, without using the window 8 and the base plate 23, 23' made of heat resisting resin.

In the construction described above, the assembling of the instrument panel unit is carried out in a following manner.

For example, referring to FIG. 2, the mounting of the center display 2 to the center window $8_1$ is performed by inserting the center display 2 into the frame-type fixture guide 9. Through this insertion, the locking projections 15 are engaged with the locking holes 14 so as to be locked therein. As the same time, as illustrated in FIG. 4, the connector portion 20 is brought into face-to-face contact with the connecting portion 19 of the branch $18_1$ of the circuit element 17, and the circuit conductor 18a and the circuit conductor 20a at the both connecting portions 20 and 19 are contacted with each other for providing electrical connection.

As described above, the mounting of the center display 2 into the window $8_1$ can be performed in a considerably easy and simple manner. Further, in place of the center display 2, an audio set such as a stereophonic sound set may be mounted.

Further, as to the mounting of the air bag unit 4 into the mounting window $8_3$ is accomplished by inserting the air bag unit 4 into the insertion-type fixture guide 10 at the back from the upper side thereof, which causes the connecting portion of the air bag unit 4 to contact with the connecting portion 19' of the spacer 21 for being connected with the circuit element 17 through the branch $18_2$. Referring to FIG. 3, the air bag unit 4 is locked to the guide frame 10a through the engagement between the locking hole 14' and the locking projection 15'.

The mounting of the sensor integration 7 to the window $8_4$ is also performed by inserting the sensor integration 7 into the drawer-type fixture guide 11 and, as shown in FIGS. 5A and 5B, the tension of the leaf spring 22 or 22' maintains the proper contacts between the connecting portions 19 and 20.

Further, the switch contact plate 5 is secured as being faced to the window $8_5$ by using screws as described above, thus permitting the connecting portion 20' of the base plate 23 to contact, in a face-to-face relationship, with the connector of the branch $18_4$ as shown in FIG. 6.

Remaining second display 3, function parts and control parts, such as the control unit 16, are also mounted in the same manner as described above through the fixture guides 9' and 10'.

Further, the mounting of the key top 28 onto the switch contact plate 5 can easily be done, as illustrated in FIG. 6, after the base plate 23 being mounted to the instrument panel A.

Consequently, as indicated in FIG. 2, when the duct box B is lowered from the upper side of the instrument panel A, the main ducts 31 and the subducts 31' are fitted into the duct covers 12, 12' at the inside of the instrument panel A as being guided and engaged with the duct covers 12, 12' to accomplish the assembling of the instrument panel unit.

The mounting of the duct box B reinforces the overall structure of the instrument panel A and makes the back side thereof fully enclosed, therefore, it provides a dustproof function for the variety of function parts 2, 3, 4, 5 and the control parts (control unit 16) mounted to the instrument panel A.

As described above, every kind of function parts and control parts are remarkably and easily mounted on the instrument panel A and connected to the circuit element 17, and the duct box B, which also functions as a reinforcing and dustproofing means, is attached to the rear surface of the instrument panel A, therefore, the instrument panel unit can be handled as a single unit. It is a matter of course that the instrument panel unit can be handled as a single unit in such a state that the duct box B is removed.

As described above, what the car manufacturer side should do is to mount this instrument panel unit into a dashboard only, and he or she does not have to do troublesome and time-consuming work such as arranging a wire harness in a narrow space within an instrument panel, fixing many electrical equipments and connecting those equipments to connectors, which have been encountered with the conventional motor vehicle manufacturing process employing a conventional instrument panel.

Figure 8A:
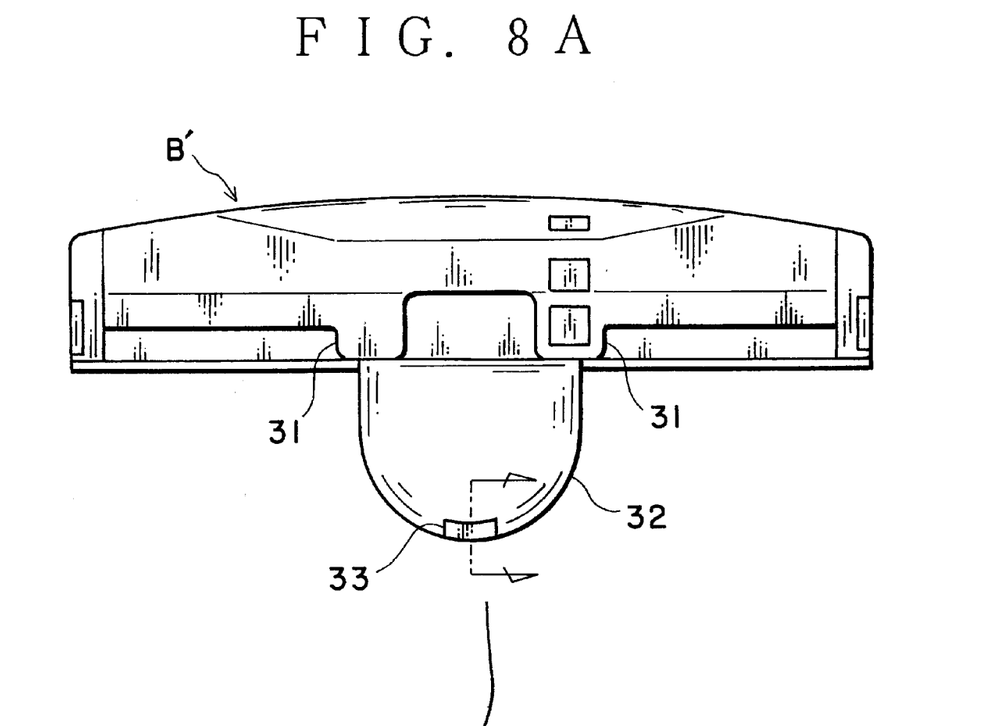
FIG. 8A is a front view of another embodiment of the duct box illustrated in FIG. 2.
Figure 8B:
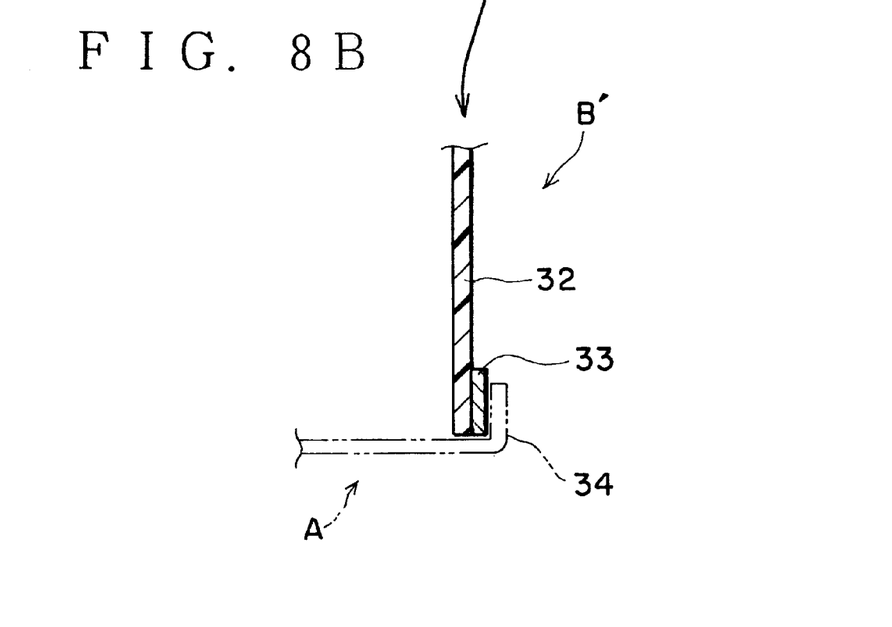
FIG. 8B is a partially cross-sectional side view of the duct box in a state of being mounted.

FIGS. 8A and 8B show another embodiment of the duct box.

In the duct box B', as illustrated in FIG. 8A, a skirt portion 32 is extended from the lower portion of the duct box B to enclose the lower portion of the instrument panel A and, at a lower edge of the skirt portion 32, a fixed rib 33 is provided and, to a lower edge of the instrument panel A, a locking portion 34 for the fixed rib 33 is provided.

According to the construction above, in similar to the embodiment which has been described, when the duct box B' is mounted to the rear surface of the instrument panel A, the lower portion of the instrument panel A is isolated from the exterior at the skirt portion 32, which strengthens the dustproof effect.

Figure 9:
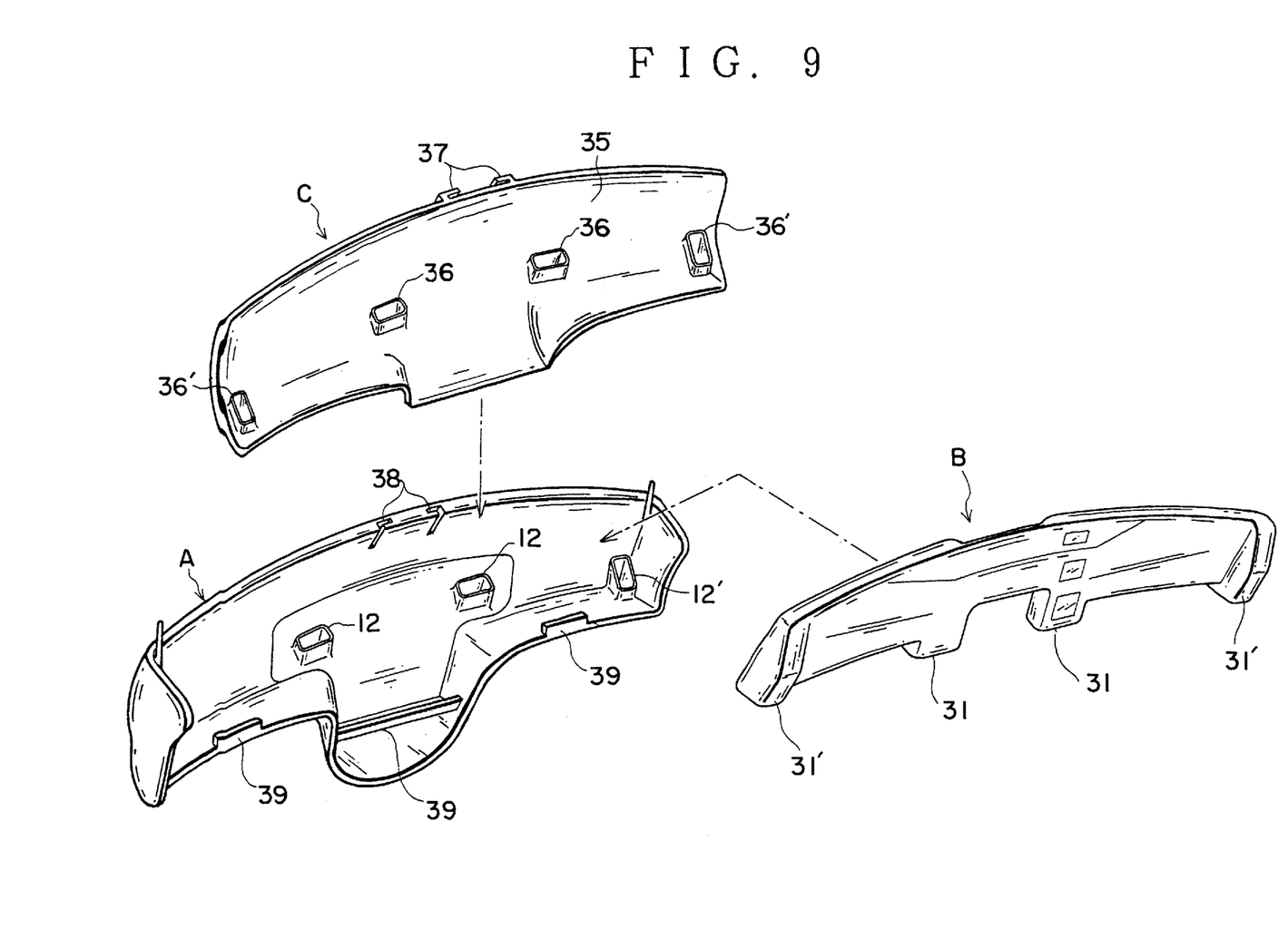
FIG. 9 is an explanatory drawing for illustrating an instrument panel unit according to another embodiment of the present invention.

FIG. 9 shows the instrument panel unit according to another embodiment of the present invention.

In FIG. 9, reference numeral C indicates a cover member of the instrument panel A and is disposed between the instrument panel A and the duct box B. That is, the cover member C is provided with second duct covers 36, 36', which engage with the duct covers 12, 12' of the instrument panel A, on a cover plate 35 for covering the back of the instrument panel A, and that a pair of fixing hooks 37 at the upper edge thereof.

While, the instrument panel A is provided with a pair of engaging portions 38 for the fixing hooks 37 on the upper edge thereof.

With the instrument panel unit according to the embodiment illustrated in FIG. 9, as described above, a variety of function parts and control parts are mounted onto the instrument panel A, and then the cover member C is attached thereto from the rear side thereof, which causes the second duct covers 36, 36' of the cover plate 35 to engage with the outside of the duct covers 12, 12' and that the lower end edge of the cover plate 35 to be supported by the locking portion 39 and, further the upper edge of the cover plate 35 is engaged with the hooks 37 of the instrument panel A at the engaging portions 38. Then, the duct box B may be mounted in the same manner as the previous embodiment.

In this embodiment, the mounting of the cover member C further improves the dustproof effect at the back of the instrument panel.

With the instrument panel unit described above, since on the front wall of the instrument panel are mounted by a variety of function parts and control parts; a circuit element and connectors for electrically connecting the function parts and the control parts to each other; and fixture guides for mounting the above-mentioned equipments on the back of the front wall, the number of parts. used for the instrument panel unit is decreased and the manpower for the connection work required for electrical wiring is also decreased.

Further, the instrument panel according to the present invention can be handled as one unit in which a. variety of function parts and control parts and a circuit element for electrically connecting those parts to each other are integrally accommodated, therefore, instrument panel sublines can be eliminated at the motor vehicle manufacturer, resulting in considerable increase in its productivity.

Still further, with the instrument panel unit described above, a switch contact portion is directly formed on the instrument panel, so that a switch unit as a function part is unnecessary, resulting in decreased number of parts. Further, since only the switch contact plate including the switch contact portion is made of heat resisting resin, material cost of instrument panel can also be held down, and electrical parts can automatically connected by employing automatic soldering. Further, since the switch contact plate is attached to one of the plurality of windows, the plate is also mounted to the back of the instrument panel like the function parts.

With the above construction, only essential parts can be protected to decrease dead space at the back of the instrument panel.

With the above-mentioned instrument panel unit, the back of the instrument panel is protected by the duct box or the cover member, so that the function parts are protected from being damaged at the mounting on the rear surface, the reliability of the products are improved, safety at its transportation is secured, and the distribution of the instrument panel unit itself can be carried out smoothly.

In the instrument panel unit described above, the connectors are of face-to-face contact type connectors, which permits the conductor of the circuit element to be used as connector terminals, resulting in reduced number of parts for the instrument panel unit.

What is claimed is:

1. An instrument panel unit comprising:

an instrument panel made of synthetic resin;

a plurality of windows formed on a front wall of said instrument panel;

a first fixture guide attached to a position, which corresponds to said plurality of windows, on the back of said front wall of the instrument panel;

a second fixture guide attached on the back of the front wall of the instrument panel;

function parts mounted to said plurality of windows of the instrument panel, said function parts provide displays, operations, and safety functions, such as meters, switches, and air bag system at a passenger seat;

control parts accommodated in said instrument panel for controlling said function parts;

a circuit element accommodated in said instrument panel along a surface of the back of the front wall, said circuit element having branches extending to the first and second fixture guides, and connecting the function parts and the control parts with each other; and connectors attached to ends of said branches, the function parts, and the control parts, wherein when the function parts are mounted to the first fixture guides and the control parts are mounted to the second fixture guides, said connectors are connected with each other for electrically connecting the function parts and the control parts through the circuit element.

2. The instrument panel unit as claimed in claim 1, further comprising a switch contact portion constituting a switch contact plate on said front wall of the instrument panel.

3. The instrument panel unit as claimed in claim 2, wherein said switch contact plate is made of a heat resisting resin different from said synthetic resin of said instrument panel, on which heat resisting resin the switch contact portion is provided.

4. The instrument panel unit as claimed in claim 2, wherein said switch contact plate is attached to respective one of said plurality of windows.

5. The instrument panel unit as claimed in claim 1, further comprising dustproof covers independently mounted to said function parts and said control parts on the back of the front wall.

6. The instrument panel unit as claimed in claim 1, further comprising a duct box at the back of said instrument panel.

7. The instrument panel unit as claimed in claim 1, further comprising a cover member at the back of said instrument panel.

8. The instrument panel unit as claimed in claim 7, wherein said cover member is mounted between the instrument panel unit and the duct box.

9. The instrument panel unit as claimed in claim 1, wherein said connectors include face-to-face contact type connectors.

* * * * *